INVENTOR
John Errol Still
BY
ATTORNEY

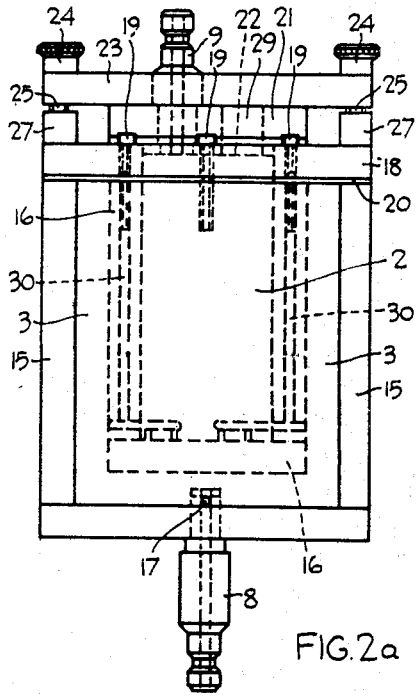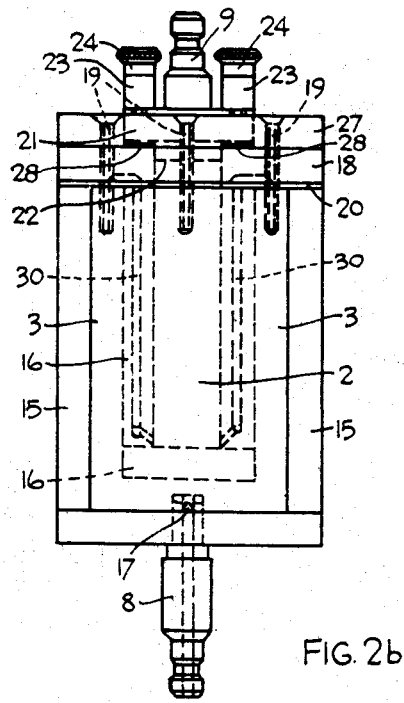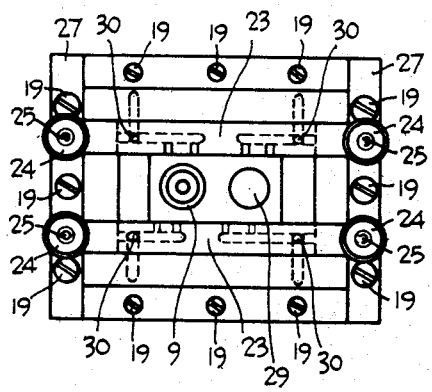

Aug. 30, 1955

J. E. STILL 2,716,371

APPARATUS FOR MEASURING THE SATURATION
TEMPERATURE OF SOLUTIONS

Filed May 21, 1951

INVENTOR
John Errol Still
BY
ATTORNEY

United States Patent Office 2,716,371
Patented Aug. 30, 1955

2,716,371

APPARATUS FOR MEASURING THE SATURATION TEMPERATURE OF SOLUTIONS

John Errol Still, Wembley, England, assignor to The General Electric Company Limited, London, England Application May 21, 1951, Serial No. 227,324

Claims priority, application Great Britain May 22, 1950

8 Claims. (Cl. 88—14)

This invention relates to methods of and apparatus for measuring the saturation temperature of solutions.

More particularly the invention is concerned with methods of and apparatus for measuring the saturation temperature of transparent liquid solutions of a single solute, of which a crystal or part of a crystal of the solute material is available. The term "solution" as used in this specification is to be construed as meaning a solution as set out in the foregoing sentence. Requirements arise in manufacturing and laboratory processes, for example the process of growing ethylene diamine tartrate crystals, as described in copending United States patent application Ser. No. 227,323 now abandoned, for making simple accurate and easily repeated measurements of the saturation temperature of the solution. Thus in the process described in the aforesaid patent application, it is required during the crystallisation process that the saturation temperature of the solution, in which the crystals are being grown, may be checked at regular intervals to ensure that the supersaturation of the solution is maintained within desired limits. The supersaturation of the solution, defined for the purposes of this specification as the number of degrees centigrade by which the solution is below its saturation temperature, is usually maintained during crystallisation between 1° C. and 3° C. and it is therefore necessary, in order to check the supersaturation, to measure the saturation temperature of the solution to an accuracy of a few tenths of a degree centigrade.

It is one object of the present invention to provide a method of making simple accurate and easily repeated measurements of a saturation temperature of a solution.

It is a further object of the present invention to provide apparatus for measuring the saturation temperature of a solution which apparatus may be both simple and accurate in operation.

According to one feature of the present invention a method of measuring the saturation temperature of a body of solution comprises circulation of the solution from the body continuously through a circuit including in the order given, heating means for controlling the temperature of the solution passing through it to the remainder of the circuit, a liquid container having an inlet and an outlet arranged so that when the solution is passing between the inlet and the outlet it fills completely the part of the volume of the container lying between two opposite areas of the walls, which areas are transparent and plane parallel, mounting a crystal or part of a crystal of the solute material in the said volume of the liquid container lying between the opposite areas of its walls with a growing face lying in a plane intersecting both said opposite areas, mounting a linear slit source of light with the slit in a plane approximately perpendicular to that of the said growing face so that it may be viewed through the said opposite areas and the solution passing between them and on so doing appears to intersect the said growing face at an acute angle, observing the apparent direction of bend, if any, of the slit at the point where it appears to intersect the said growing face, controlling the temperature of the solution passing through the heating means to alter, if necessary, the temperature of the solution in the liquid container near the crystal or part of a crystal until the slit no longer appears to bend, and measuring the temperature of the solution near the crystal or part of the crystal when the slit no longer appears to bend.

It is found that where the solution has a positive solubility/temperature coefficient, the slit when observed in a method according to the present invention appears to bend in the direction of the acute one of the two angles formed outside the said growing face at the apparent intersection of the slit, if the solution is below its saturation temperature when passing over the said growing face of the crystal or part of the crystal. Conversely, if the solution is above its saturation temperature when passing over the said growing face, the slit appears to bend towards the obtuse one of the same two angles.

According to a further feature of the present invention apparatus for measuring the saturation temperature of the solution comprises a liquid container having an inlet and an outlet arranged so that when the liquid is passing between them it fills completely the part of the volume of the container lying between two opposite areas of the walls which areas are transparent and plane parallel, means for circulating solution from the body of solution, of which the saturation temperature is to be measured, in a continuous stream through the apparatus, heating means, through which the solution is passed in operation, for controlling the temperature of the solution passing into the container, means for mounting a crystal or a part of a crystal in between the oppostie areas with a growing face lying in a plane intersecting both the said opposite areas, means for measuring the temperature of the solution in the container near the said crystal or part of a crystal, a linear slit source of light, and means for mounting the linear slit source of light so that it may be viewed through the said opposite areas along a line of sight lying in a plane of said growing face, the slit lying in a plane approximately perpendicular to the line of sight and being oriented in said plane so that on so doing it appears to intersect the said growing face at an acute angle.

Preferably the acute angle at which the slit appears to intersect the said growing face of the crystal or part of a crystal lies within the range of approximately 10°–80°, but it is found that in operation the best results are obtained if the acute angle lies between 30° and 40°.

Preferably the liquid container is surrounded by a jacket through which the solution is passed, in operation, before passing through the liquid container, in order to reduce the temperature irregularities which may occur in the solution passing through the liquid container, the walls of the jacket being transparent, plane and parallel to the walls of the liquid container over the areas opposite said opposite areas of the liquid container's walls. The apparatus may include an optical arrangement whereby an image of a linear slit source of light may be viewed instead of the linear slit source itself.

The temperature of the solution near the crystal or part of a crystal may be measured simply by some form of thermometer or alternatively a differential thermocouple may be used, one junction being immersed in the solution near the crystal or part of a crystal, the other junction being immersed in the body of solution, and the arrangement being such that the supersaturation of the solution in the body thereof may be read directly (unsaturated solutions being taken as having a negative supersaturation).

The apparent bending of the slit source of light when the solution is not exactly saturated depends on there being in contact with the growing face of the crystal, a layer of solution of different concentration from the remainder of the solution. It is thought that the concentration varies across the layer from the saturation concentration, at the temperature of the solution, at the growing face of the crystal to that of the body of solution at a distance from the crystal. The refractive index of the solution will in consequence vary similarly across the layer, and this variation causes the apparent bending of the line of light, the direction of bend depending on whether the solution becomes more or less dense on traversing the layer away from the crystal face, that is, whether the solution in the container is super-saturated or unsaturated. The apparent bending only occurs if the slit is oriented so that the line of light appears to enter the growing face at an acute angle. No bending occurs if it appears to enter it at right angles. The apparent bending is very readily noticed if the solution is only two or three degrees centigrade from its saturation temperature for the slit appears not only to bend in the appropriate direction but to run off a short distance along the crystal face in that direction. It is possible for an experienced operator to detect the effect so as to measure the saturation temperature of the solution to within the limits of ±0.1° C.

A method of measuring the saturation temperature of a solution and apparatus for carrying out said method, in accordance with the present invention, as applied to the measurement of the saturation temperature of ethylene diamine tartrate solutions during a process of growing crystals of that substance will now be described by way of example with reference to the accompanying drawings in which, Figure 1 shows a general view of the apparatus as mounted for operation, some of the detail however being omitted for the sake of clarity.

Figures 2a, 2b and 2c show front and side elevations and a plan view of a cell forming part of the apparatus.

Figure 1:
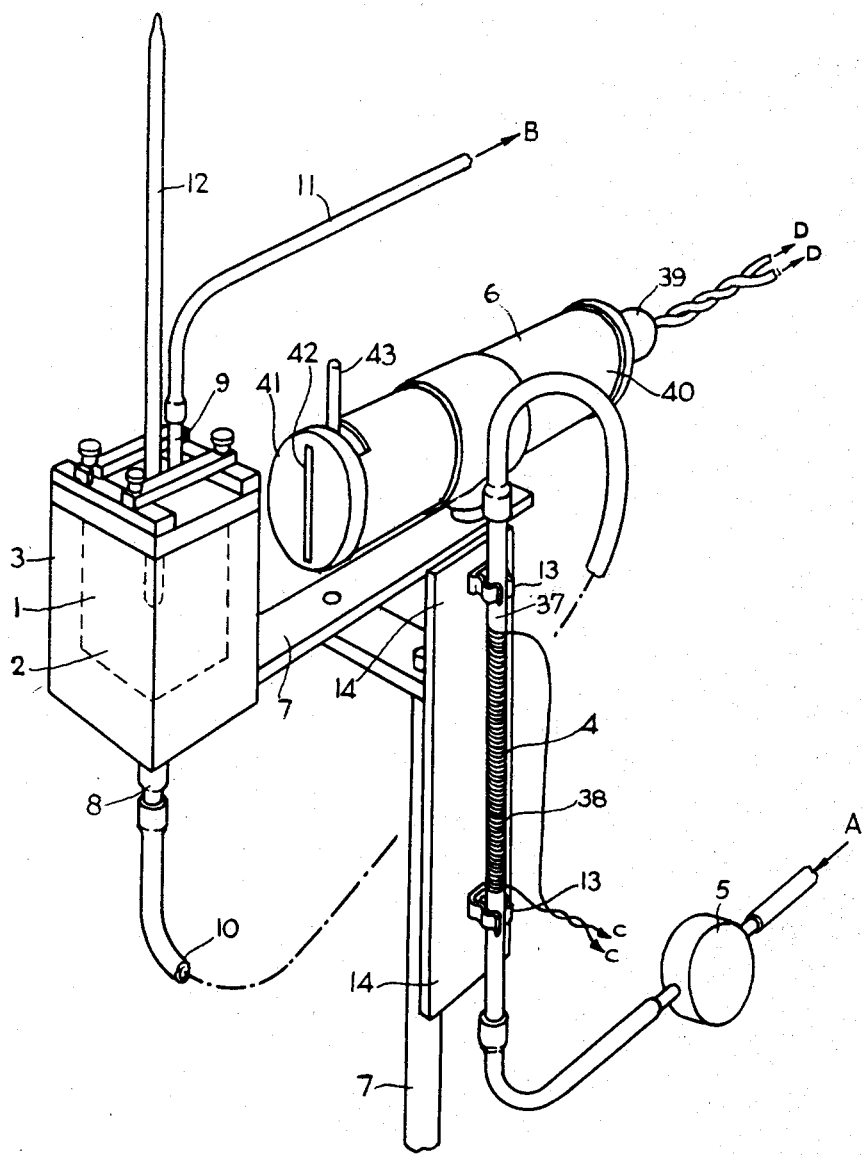

Referring now to Figure 1 of the accompanying drawings, there is shown a general view of the apparatus mounted for operation. Various details of the parts of the apparatus have been omitted for the sake of clarity, the details being shown in the remaining figures of the accompanying drawings in which the parts are illustrated separately. The main features of the apparatus are a cell 1 which includes a liquid container 2 (shown in dotted outline) within a jacket 3, a solution heater 4, a pump 5 (represented only diagrammatically) for circulating solution through the apparatus and a linear slit source of light 6. The cell 1, the solution heater 4 and the source of light 6 are all held in position by clamps mounted on a retort stand 7. The solution heater 4 is held in spring clips 13 mounted on a plastic plate 14 secured to the retort stand 7.

The cell 1 has an inlet 8 and an outlet 9, the inlet 8 being connected by a length of rubber tubing 10 to the upper end of the solution heater 4 and the outlet 9 being connected to a return to the body of the solution indicated by the arrow "B." The lower end of the solution heater 4 is connected by a length of rubber tubing to one side of a pump 5, the other side of which is connected to an intake from the body of the solution, indicated by the arrow "A." In operation of the apparatus, the pump 5 draws solution through the intake from the body of the solution through itself, through the solution heater 4 and the cell 1, and then returns it to the body of the solution. As the solutions passed through the apparatus are all at temperatures in the region of their saturation temperature, it is desirable that the passage of the solution shall be as smooth as possible and that there shall be no pockets in which the solution may become trapped and undesired crystallisation take place. A thermometer 12 projects into the liquid container 2.

The construction of the cell 1 will now be described in detail with reference to Figures 2a, 2b and 2c of the accompanying drawings which show respectively end and side elevations and a plan view of the cell 1. The cell 1 is constructed almost entirely of methyl methacrylate plastic, for the most part in ¼" thick sheets. This material was chosen as it may be readily cemented by moistening the surfaces to be joined with chloroform and then gently pressing them together until the joint is set. The construction of the cell 1 will now be described using the terms "top" and "bottom," etc., with reference to the cell 1 as held in its operational position.

The cell 1 comprises two differently sized rectangular structures 15 and 16 one inside the other, the inner structure 16 forming the walls of the liquid container 2 and the space between the structures 15 and 16 forming the jacket 3 for the liquid container 2. The outer structure 15 has outside dimensions approximately 2⁷⁄₁₆" by 2½" by 2" and in operation is held with the long dimension vertical. The bottom of the structure 15 has a hollow tube 8 cemented through it, which in operation is used as an inlet to the cell 1. A part of the tube 8 is reinforced and the cell 1 is supported by gripping this reinforced part in the jaws of a clamp. The inner end of the tube 8 is closed, but four horizontal outlet holes 17 directed one at each of the four walls of the structure 15 are provided to allow liquid to pass into the jacket 3. The four holes 17 are so arranged to try and ensure an even flow of liquid through all parts of the jacket 3.

The top 18 of the structure 15 is separate from the remainder and is secured to it when required by brass screws 19 passing through holes near its perimeter and in corresponding places in the top edges of the walls of the structure 15. The joint is made watertight by a rectangular rubber gasket 20.

The inner structure 16 has outside dimensions approximately 2³⁄₁₆" by 1½" by 1" and is cemented to the top 18 of the outer structure 15, with its long dimension vertical. The upper face of the structure 16 forms an open rectangular well in the top 18 of the outer structure 15. A lid 21 of methyl methacrylate plastic is provided for the liquid container 2, a projection 22 on one surface of the lid 21 being arranged to fit into an aperture in the top 18 of the outer structure 15. When required the lid 21 is held in position by two metal bars 23, which themselves are clamped down by knurled nuts 24 screwed on to bolts 25 projecting from two metal bars 27. The metal bars 27 are held on the top 18 by some of the screws 19 which secure the top 18 to the remainder of the outer structure 15. A rectangular rubber gasket 28 is provided between the bearing surfaces of the lid 21 and the top 18 to make the joint watertight. A hollow tube 9, which in operation forms the outlet of the cell 1 is cemented into the lid 21, and a hole 29 is provided in the lid 21 through which the thermometer 12 supported by a bung may be inserted into the liquid container 2.

The walls of the inner structure 16 are traversed by four channels 30 which enable the solution to pass from the top of the jacket 3 to the bottom of the liquid container 2, the liquid channels 30 at the top, passing for a short distance through the top 18 of the outer structure 15 when secured in position, so that the jacket 3 remains completely filled in operation.

In operation a small piece of crystal is supported within the liquid container 2 by a small wire stand. The stand is constructed from stainless steel wire twisted together so as to form a stand having four substantially coplanar feet and two parallel lengths between which a small piece of crystal may be securely wedged. The parallel lengths lie about an inch above the feet and in consequence when the stand is placed on the bottom of the liquid container 2, a piece of crystal wedged between the lengths is supported near the centre of the liquid container 2. Referring again to Figure 1 of the accompanying drawings, the solution heater 4 comprises simply a straight length of glass tube 37 through which the solution is passed, and on which is wound a coil 38 of enamelled resistance wire. A suitable construction of the coil 38 has been found to be one in which it is a coil about 5" in length of closely wound 42 gauge wire having a total resistance of about 1000 ohms, the external diameter of the tube 37 being ¼". The leads C from the coil 38 are connected to the output of a variable auto-transformer, the input of which is connected to a 230 volts 50 cycles mains supply. A device (not shown in the drawings) is inserted in the tube 37 at the end which is connected to the cell 1, to ensure thorough mixing of the solution leaving the solution heater 4 and thus uniformity of temperature over the cross section of the stream. The device consists simply of a length of about two inches of stainless steel wire having a diameter about one third of the internal diameter of the tube 37. A further length of the same wire is wound on to the first length to form an open-pitch helix of about ten complete turns, which it will be appreciated has an external diameter approximately equal to the internal diameter of the tube 37.

The pump 5 may be any suitable reversible electric pump, preferably having a fairly straight path for the solution to pass through, working from the 230 volts 50 cycles mains supply and capable of pumping at a rate of about 10 litres of solution per hour. A particularly suitable type of pump is that which is known as the squeezed rubber tubing type.

The slit source of light 6 is of a type commonly used in optical apparatus and comprises simply a 15 watt tungsten filament lamp mounted on a socket 39 and inserted in one end of a cylindrical brass case 40, the other end of the case being a brass disc 41 containing a linear slit 42. The disc 41 may be rotated about the axis of the case 40, a bar 43 attached to the disc 41 being provided to enable the orientation of the slit 42 to be altered easily. A diffusing screen, not shown in the drawings, is contained within the case 40 between the lamp and the slit 42, to provide a more uniform illumination of the slit 42. Leads D from the lamp are connected to a 230 volts 50 cycles mains supply.

Figure 3:
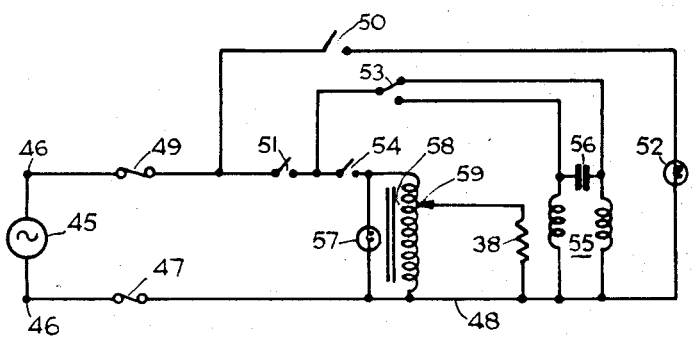
Figure 3 shows a circuit diagram of the electrical parts of the apparatus.

The electrical controls for the apparatus are conveniently located on one control panel, and a diagram of the electrical circuit is shown in Figure 3 of the accompanying drawings. Referring to Figure 3, a 230 volts 50 cycles mains supply 45 is connected between the terminals 46. One terminal 46 is connected through a fuse 47 to a common lead 48 and the other terminal is connected through a fuse 49 to one side of each of two switches 50 and 51. The side of the switch 50 not connected to the terminal 46 is connected to one terminal of the lamp 52 of the slit source of light 6, the other terminal of the lamp 52 being connected to the lead 48. The switch 50 therefore controls the slit source of light 6. The other terminal of the switch 51 is connected to the moving member of a two-way switch 53 and to one terminal of a switch 54.

The two-way switch 53 acts as a reversing switch for the electric pump 5, the two windings 55 of the motor being connected between each of the fixed terminals of the switch 53 and the lead 48. A phase-splitting condenser 56 is connected between the leads of the two windings 55.

The other terminal of the switch 54 is connected to one terminal of an indicating lamp 57 and to one input terminal of variable auto-transformer 58, the other terminal of both being connected to the lead 48. The variable tapping 59 of the transformer 58 is connected to one terminal of the coil 38 of the solution heater 4, the other terminal of the solution heater being connected to the lead 48.

The switch 50 as mentioned previously controls the source of light 6, the switch 51 controls the application of power to both the pump 5 and the coil 38 of the solution heater 4, and ensures that power cannot be applied to the coil 38 when the pump 5 is not working, the switch 53 is a reversing switch for the pump 5 and the switch 54 controls the application of power to the coil 38 when the switch 51 is made. Adjustment of the position of the tapping 59 of the transformer 58 varies the amount of power applied to the coil 38.

The method of operation of the above apparatus for measuring the saturation temperature of ethylene diamine tartrate solutions during the process of growing crystals, for example, as described in copending United States patent application Serial No. 227,323, now abandoned, will now be described.

A small piece of a crystal of ethylene diamine tartrate is inserted in the wire stand and placed in the liquid container 2 with a growing face lying in a plane intersecting the front and the back faces of the liquid container 2 and the jacket 3 approximately perpendicularly. The lid 21 of the liquid container 2 is clamped in position and a thermometer 12, supported by a bung, is inserted in the hole 29 in the lid 21, with the bulb of the thermometer 12 arranged near the piece of crystal in the liquid container 2. The pump 5, the solution heater 4, and the cell 1 are connected up by lengths of rubber tubing as previously described, the pump 5 is similarly connected to an intake from the crystal growing tank, and the outlet 9 of the cell 1 is connected to a return to the crystal growing tank. The linear slit source of light 6 is positioned so that it may be viewed through the front and back faces of the liquid container 2 and the jacket 3, the slit lying in a plane perpendicular to a line of sight lying in the plane of the growing face of the piece of crystal and being oriented in that plane to appear when viewed along that line of sight to intersect the growing face at an angle of 30°–40°. The orientation of the planes of the slit and the crystal growing face are adjusted relative to one another by rotating the cell 1 in the clamp in which it is held.

The switch 50 having been made and the position of the light source 6 adjusted, the switch 51 is made and the switch 53 set so that the pump 5 is switched on to circulate solution from the crystal growing tank through the apparatus. The heater switch 54 is then made and the variable tapping 59 of the transformer 58 is adjusted in the light of previous experience and any knowledge of the characteristics of the solution, so that the solution in the liquid container 2 attains a steady temperature in the neighbourhood of its saturation temperature. If the apparatus is originally at room temperature and the solution on which measurements are to be made is at about 45° C., a period of about ten minutes is required to obtain the desired steady temperature. The characteristics of the slit of light where it intersects the growing face of the piece of crystal is observed and the variable tapping 59 adjusted to bring the the temperature of the solution around the piece of crystal nearer to its saturation temperature.

In practice, more correct readings of the saturation temperature of the solution around the piece of crystal may be obtained by running the temperature of the solution around the piece of crystal backwards and forwards through its saturation temperature and obtaining the saturation temperature reading by a "bracketing" method. When operation is completed the apparatus is emptied by disconnecting the return B from the tank, and reversing the pump 5, by changing the position of the switch 53.

Figures 4A, 4B, 4C:
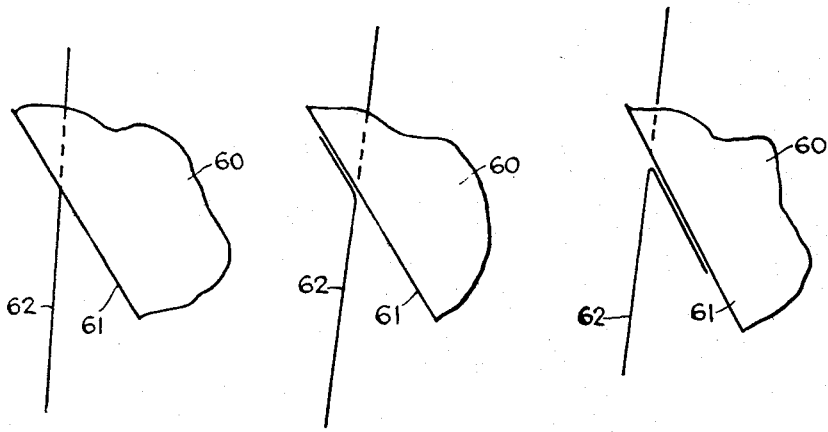
Figures 4a, 4b and 4c are diagrams illustrating the effect on which the method of operation of the apparatus depends.

Figures 4a, 4b and 4c illustrate the effect on which the operation of the apparatus depends and which has been previously described. In each of the figures there is shown a piece of crystal 60 having a growing face 61 and the slit of light 62 intersecting the growing face 61 and partially disappearing behind the piece of crystal 60. In Figure 4a the solution around the piece of crystal 60 is at its saturation temperature and as a result the slit of light 62 appears to enter the growing face 61 without deviating. In Figure 4b the solution around the piece of crystal 60 is about 2° C. above its saturation temperature and in consequence the slit of light 62 appears to bend towards the obtuse one of the two angles formed outside the growing face 61 by the intersection of the slit of light 62 and the growing face 61. The slit of light 62 also appears to run along the growing surface 61 in the same direction for a short distance. In Figure 4c, the solution around the piece of crystal 60 is about 2° C. below its saturation temperature, and in consequence the slit of light 62 appears to bend towards the acute one of the said two angles, and also appears to run along the growing face 61 for a short distance in the same direction.

It may be stated that the addition of 20 milliliters of water to a 20 litre tank of solution has been detected by an experienced operator using the apparatus and the method described above.

I claim:

1. Apparatus for measuring the saturation temperature of a body of solution comprising a liquid container having an inlet and an outlet arranged so that when the liquid is passing between them it fills completely the part of the volume of the container lying between two opposite areas of the walls which areas are transparent and plane parallel, means for circulating solution from the body of solution, of which the saturation temperature is to be measured, in a continuous stream through the apparatus, heating means, through which the solution is passed in operation, for controlling the temperature of the solution passing into the container, means for mounting a crystal or a part of a crystal in between the said opposite areas with a growing face lying in a plane intersecting both the said opposite areas, means for measuring the temperature of the solution in the container near the said crystal or part of a crystal, a linear slit source of light, and means for mounting the linear slit source of light so that it may be viewed through the said opposite areas along a line of sight lying in the plane of said growing face, the slit lying in a plane approximately perpendicular to the line of sight and being oriented in said plane so that on so doing it appears to intersect the said growing face at an acute angle.

2. Apparatus according to claim 1 including a jacket round the liquid container through which, in operation, the solution is circulated before passing through the liquid container, the walls of the jacket being transparent, plane and parallel to the walls of the liquid container over the areas opposite said opposite areas of the liquid container walls.

3. Apparatus according to claim 2 in which the liquid container and the jacket are both part of a single cell, constructed mainly of transparent material, which cell comprises an outer hollow rectangular structure within which is an inner rectangular structure having walls parallel to those of the outer jacket, the space between the two structures forming the jacket and the inside of the inner structure forming the liquid container, the outlet from the liquid container and the inlet to the jacket being channels to the exterior of the cell and the jacket and the liquid container being connected by a channel through the walls of the inner rectangular structure.

4. Apparatus according to claim 3 in which when the cell is in its operational position, the outlet from the liquid container is through a liquid channel from the top thereof, the inlet to the jacket is through a channel to the bottom thereof and the top of the jacket is connected to the bottom of the liquid container by at least one channel through the walls of the inner rectangular structure.

5. Apparatus according to claim 1 in which the slit of the slit source of light may be rotated in a plane in which it lies.

6. Apparatus according to claim 1 in which the heating means comprises a length of glass tube through which solution may be passed, a coil of wire wound on the outside of it and adjustable source of electrical power connected across the coil.

7. A method of measuring the saturation temperature of a body of solution comprising the steps of circulating the solution between a pair of transparent walls and over at least part of the growing face of a crystal of the solute material mounted between said walls with its said face lying in a plane intersecting both said walls so that the crystal can be seen through said walls, viewing a slit source of light through said walls and the solution lying therebetween and along a line of sight lying in the plane of the growing face with the slit positioned and oriented to appear to intersect the growing face at an acute angle, varying the temperature of the solution until the slit appears to be straight, and measuring the temperature of the solution in the region of the crystal when the slit appears straight.

8. A method according to claim 7 in which the said acute angle lies between thirty and forty degrees.

References Cited in the file of this patent

UNITED STATES PATENTS

| | | |
|---|---|---|
| 1,471,342 | Logan | Oct. 23, 1923 |
| 2,387,825 | Bond | Oct. 30, 1945 |
| 2,427,996 | Seaman | Sept. 23, 1947 |
| 2,483,102 | Pierson | Sept. 27, 1949 |
| 2,484,829 | Holden | Oct. 18, 1949 |
| 2,562,325 | Merritt | July 31, 1951 |

OTHER REFERENCES

Pfund, "The Refractive Index of Matter in Cylindrical Form," pages 410, 411 and 412 of Journal of the Optical Society of America, volume 30, September 1940.